United States Patent [19]

Whiteman

[11] 4,328,913
[45] May 11, 1982

[54] NON-PLUGGING SCREW CONVEYER

[75] Inventor: Patrick W. Whiteman, Lothian, Md.

[73] Assignee: Recycled Paper Bedding, Inc., Arlington, Va.

[21] Appl. No.: 125,841

[22] Filed: Feb. 29, 1980

[51] Int. Cl.³ .............................................. G01F 11/20
[52] U.S. Cl. .................................. 222/413; 198/548; 198/661
[58] Field of Search ............................... 222/411–413, 222/DIG. 1; 406/56, 60, 61; 414/218; 366/88; 425/207–209; 198/548, 558, 616, 661, 676; 221/75

[56] References Cited

U.S. PATENT DOCUMENTS

| 1,767,248 | 6/1930 | Leach | 198/616 X |
| 2,233,707 | 3/1941 | Nelson | 198/616 |
| 3,360,824 | 1/1968 | Schippers | 222/413 X |

Primary Examiner—Gil Weidenfeld
Assistant Examiner—Fred A. Silverberg
Attorney, Agent, or Firm—Davis, Hoxie, Faithfull & Hapgood

[57] ABSTRACT

This invention is directed to a new and improved screw conveyor useful for bagging animal bedding comprising subdivided newsprint. The screw of the auger has flights of predetermined different heights which avoid undue compaction of the bedding as it is conveyed.

4 Claims, 3 Drawing Figures

NON-PLUGGING SCREW CONVEYER

BACKGROUND OF THE INVENTION

In my copending application, Ser. No. 074,238, I have discovered a new and improved animal bedding prepared from cellulosic material such as newsprint, and a hammermill apparatus and process for making said bedding. My earlier application discloses utilization of screw conveyers to pick up the finished bedding from the bottom of a collection hopper and load it into bags.

It has been found that the improved bedding is difficult to pick up and transport by means of conventional screw conveying equipment, because the bedding tends to choke the conveyer. This requires frequent shutdown to clean out the screw conveyer or, alternatively, use of unusually high power, and consequent energy consumption, to operate the conveyer in an overloaded condition.

It is an object of the present invention to eliminate the problems of screw conveyer plugging and excessive energy consumption required to convey cellulosic animal bedding by screw conveyer.

SUMMARY OF THE INVENTION

Applicant has discovered that a new and improved auger, or screw, design which substantially eliminates the tendency of cellulosic animal bedding to plug a screw conveyer, and markedly reduces the power and energy requirements needed to transport cellulosic animal bedding by screw conveyer.

Figure 1:
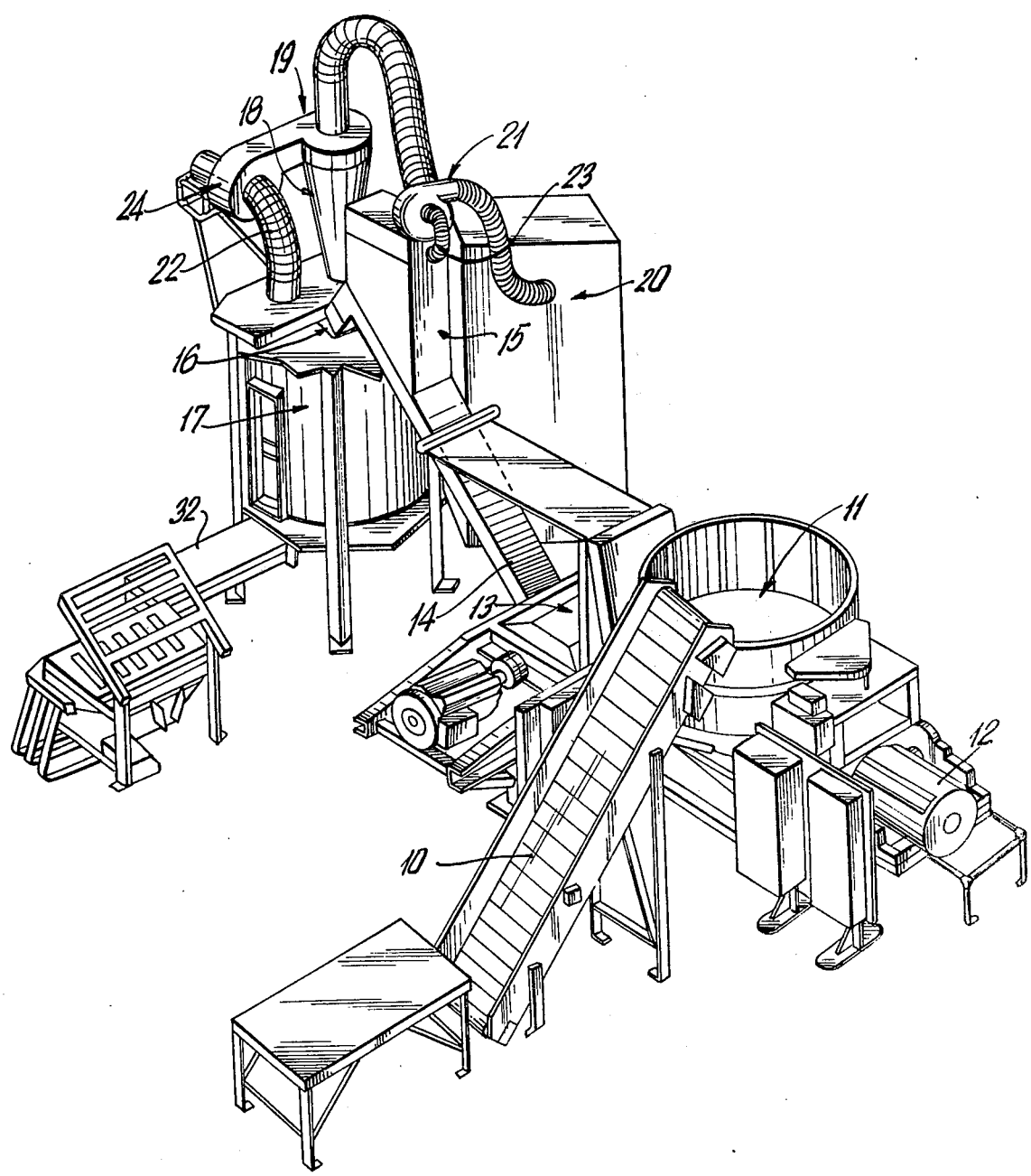
FIG. 1 depicts a commercial hammermill system, modified as described in my copending application Ser. No. 074,238. The particular hammermill depicted is a two-stage "Haybuster" model PS hammermill manufactured by Ideal Insulation, Inc. of Jamestown, North Dakota. The first stage of the mill is powered by a 150 h.p. (1785 r.p.m.) motor; the second stage, by a 100 h.p. (1775 r.p.m.) motor. Application Ser. No. 074,238 describes special hammermill screens and their arrangement necessary for making improved animal bedding from newsprint using the system of FIG. 1. The description of those screens is not repeated here.

Preparation of cellulosic animal bedding using the hammermill system of FIG. 1 is described in copending application Ser. No. 074,238. According to the process there described, newsprint is fed to the hammermill, by means of input conveyer 10. Conveyer 10 moves the newsprint to the primary grinder 11 where hammermills grind it against screens. Blower 12 cools the grinding operation. Ground material exiting primary grinder 11 moves by screw conveyer (not shown) to the secondary grinder 13, where hammermills grind it against screens shown. Blower 12 also cools the secondary grinding operation.

Ground material exiting the secondary grinder 13 moves by screw conveyer 14 to the bagger-hopper 17, which is a cylindrical container approximately four and one half feet in diameter and approximately six feet high. Before dropping into the top of hopper 17 the material passes magnet 16, which removes ferrous metal contamination.

Bagger-hopper 17 is fitted with a primary dust removal system comprising a cyclone 18, blowers 19 and 24 and dust trap 20. Cyclone 18 is mounted atop bagger-hopper 17. As ground material drops from screw conveyer 14 into an inlet port in the top of bagger-hopper 17, blower 24 draws dust and some larger particles through line 22, a nine inch line leading from the top of bagger-hopper 17 (at a point six inches distant from the material inlet port) to cylcone 18. Cyclone 18 separates dust from larger particles, which larger particles drop from cyclone 18 back into bagger-hopper 17. Blower 19 pulls the dust from cyclone 18 and passes it to dust trap 20. Blower 19 is powered by a three h.p. motor; blower 24, by a one h.p. motor.

Mounted on the discharge end of screw conveyer 14 is an enclosed chamber 15, to which is attached a secondary dust removal system comprising blower 21, powered by a one and one half h.p. motor. Blower 21 draws dust from the material in screw conveyer 14 through a three inch line 23 from a point near the top of the chamber 15 and passes it directly to dust trap 20. Line 23 is located approximately four feet above screw conveyer 14.

The finished animal bedding product collects in the bagger-hopper 17. Application Serial No. 074,238 teaches generally that screw conveyers 32 can be used to load bags, and conventional bag sealing equipment can be used for final bag closure.

Figure 2:
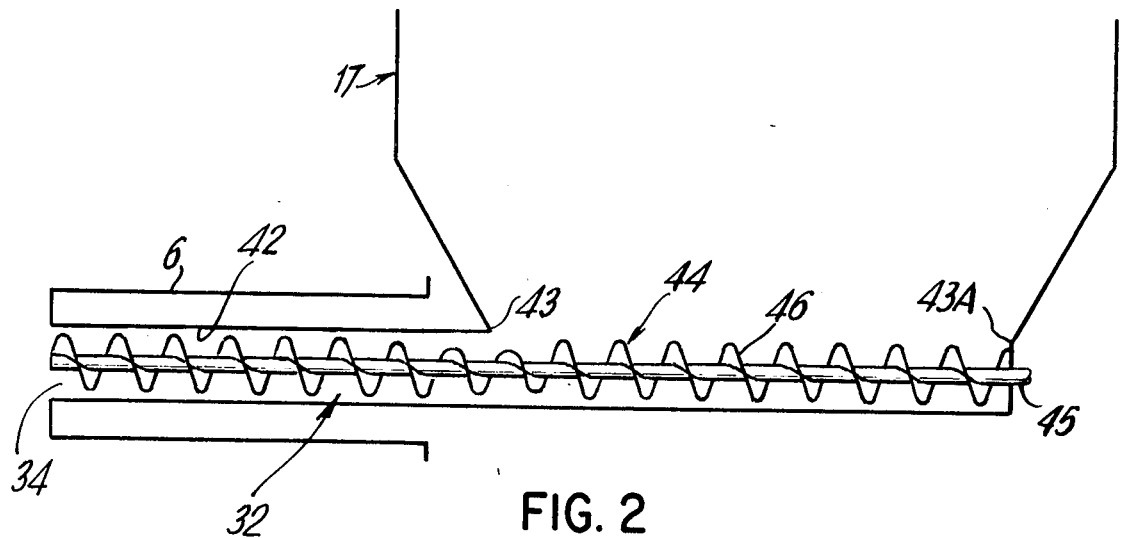
FIG. 2A is a sectional view of the improved screw conveyer of the preferred embodiment in accordance with this invention.
FIG. 2B is a detailed section view of a portion of said preferred embodiment, depicting the new and improved auger design.
Figure 3:
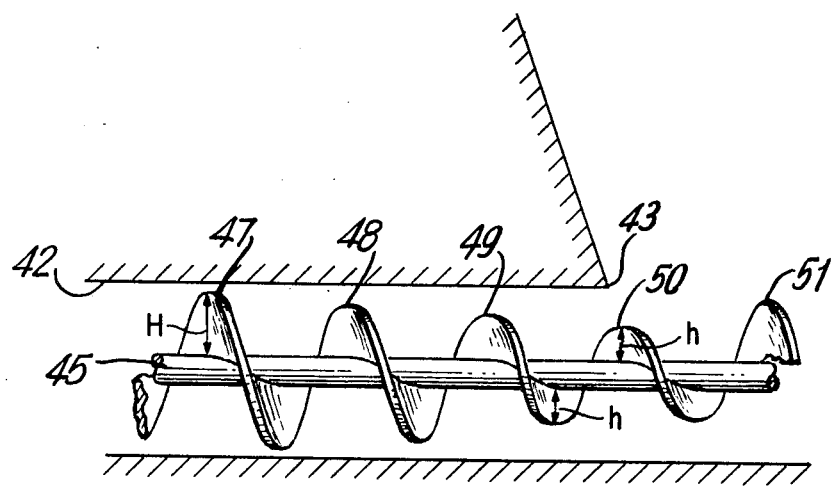

FIGS. 2 and 3 depict an improved screw conveyer in accordance with Example I of this invention. Animal bedding prepared from cellulosic material collects in bagger-hopper 17, only the bottom portion of which is shown. Bagger-hopper 17 contains a discharge slot extending from point 43 to point 43A. Bedding drops by gravity from bagger-hopper 17 into screw conveyer 32, which comprises cylindrical tube 42 and auger 44. The top portion of the tube 42 which adjoins the discharge slot 43-43A of bagger-hopper 17 is cut away to permit bedding to enter screw conveyer 32. Tube 42 is a cylinder four and three-quarters inches inside diameter.

Referring to FIGS. 2 and 3 auger 44 is rotatable within cylindrical tube 42. Auger 44 comprises a one inch steel shaft 45 having welded thereon a continuous single flight 46 about one quarter inch thick at the base and one-eighth inch thick at the tip. The maximum diameter of the auger is four and one-half inches, leaving about one-eighth inch clearance from the tube 42. Auger 44 is ninety five inches long and has nineteen turns of the flight 46. The tube 42 forms an enclosed cylindrical channel from slot edge 43 to the screw conveyer discharge 34, a distance of about fifty six inches. Numbers 47, 48, 49, 50 and 51 in FIG. 3 represent the top of the seventh through eleventh turns of the flight from screw conveyer discharge 34, respectively. As shown, the radial height H of the auger flight 46 is progressively reduced from that of turn 47 to a minimum height h in advance of turn 50. The full height H is restored for turns 51 to the start. Slot edge 43 of tube 42 is slightly downstream of turn 50.

FIG. 3 is an enlarged view of the portion of screw conveyer 32 which includes the portion of auger 44 wherein the radial height of the flight is reduced. The height of the flight 46 from discharge end 34 to turn 47 is one and three-quarter inches. The height of the flight 46 at turn 51 and upstream thereof is also one and three-quarter inches as shown. The reduction in radial height of the auger flight in the region of turns 47–51 serves to increase the clearance between the tip of the auger flight 46 and the wall of tube 42 to thereby limit the compaction of the bedding as it is conveyed by the auger.

Shaft 45 of auger 44 extends approximately ten inches beyond tube 42. Drive means are connected to shaft 45 to rotate auger 44.

A chute 6, adapted to hold a bag of the desired dimensions surrounds screw conveyer 32. In operation, a bag (not shown) is slidably mounted on chute 6. Screw conveyer 32 is activated, feeding bedding into the bag. As the bag fills, pressure from screw conveyer 32 slides the bag along chute 6. When the bag is full, screw conveyer 32 is deactivated.

EXAMPLE I

The screw conveyer depicted in FIG. 2 was fitted with an auger as described above. The radial height of the flight was one and three-quarter inches except as reduced, as shown in FIG. 3, between turns 47 and 51. The height of the flight, the overall diameter of the auger, and clearance at the turns 47 to 51 were as follows:

| Turn Number | Radial Height of Flight, inches | Diameter of Auger, inches | Clearance |
|---|---|---|---|
| 47 | 1¾ | 4½ | ⅛ |
| 48 | 1⅝ | 4¼ | ¼ |
| 49 | 1¼ | 4 | ⅜ |
| 50 | 1¼ | 3½ | ⅝ |
| 51 | 1¾ | 4½ | ⅛ |

Slot edge 43 falls between turns 49 and 50.

Power was supplied by a 10 h.p., 1740 r.p.m. motor. A jack shaft was belt driven by the motor. The motor shaft was fitted with a five inch pulley; the jack shaft, with a twelve inch pulley. The auger was chain driven by the jack shaft. The jack shaft was fitted with a twenty-tooth sprocket; the auger shaft, with a seventeen-tooth sprocket.

Animal bedding prepared according to the hammer-mill process described in example 1 of my copending application Ser. No. 074,238 was delivered to bagger-hopper 17. The bedding, prepared from newsprint, had a bulk density of about 3.05 pounds per cubic foot. It had a particle size distribution as follows: about 25 weight percent below one-thirty second inch approximate maximum diameter, about 50 weight percent between one-thirty second inch and one-quarter inch, and about 25 weight percent between one-quarter inch and one inch. Compressibility, as determined by placing a seven pound piston on a sample in a nine cm. cylinder for ten minutes, was 33.9 volume percent. Using a screw conveyer as herein described but with an auger having a flight of a uniform height of one and three-quarter inches, frequent plugging of the conveyer resulted.

Use of the same screw conveyer with the improved auger of this Example permitted filling of bags without plugging of the screw conveyer. The motor had ample power to drive the auger.

EXAMPLE II

The screw conveyer depicted in FIG. 2 was fitted with an auger as described. The height of the flight was one and three-quarter inches from the discharge end to the area of reduction and one and seven-eighths inches upstream of the area of reduction. The area of reduction extended from turn 48 to turn 51. The height of the flight, the overall diameter of the auger, and clearance at turns 47 to 51 were as follows:

| Turn Number | Radial Height of Flight, inches | Diameter of Auger, inches | Clearance |
|---|---|---|---|
| 7 | 1¾ | 4½ | ⅛ |
| 8 | 1¾ | 4½ | ⅛ |
| 9 | 1⅝ | 4¼ | ¼ |
| 10 | 1½ | 4 | ⅜ |
| 11 | 1⅞ | 4¾ | — |

Slot edge 43 falls between turns 49 and 50.

Power was supplied by a 15 h.p., 1750 r.p.m. motor. A jack shaft was belt driven by the motor. The motor shaft was fitted with a seven inch flyclutch pulley; the jack shaft, with a fifteen inch pulley. The auger was chain driven by the jack shaft. The jack shaft was fitted with a twentysix-tooth sprocket; the auger shaft, with a twenty-tooth sprocket.

Animal bedding prepared according to example I of my copending application Ser. No. 074,238 was delivered to bagger-hopper 17. Use of a screw conveyer as herein described, with the auger of this Example permitted filling of bags without plugging the screw conveyer. The motor had ample power to drive the auger.

It is believed that cellulosic animal bedding, particularly bedding having the bulk density and particle size distribution described in copending application Ser. No. 074,238, is delivered to a conventional, uniform flight totally enclosed screw conveyer tube at a rate too high to by conveyed without undue compaction and consequent plugging. An auger of the design of this invention prevents undue compaction of the bedding material. It is believed that extending the area of maximum flight reduction at least about one-half turn both upstream and downstream of slot edge 43 reduces the effective feed rate of the bedding to a level that the screw conveyer can handle without excess horsepower requirement and energy consumption. As can be seen from the Examples, reducing the height of the auger flight to a minimum of about three-quarters of its full height achieves the objective of this invention. In Example I the height of the flight was reduced from one and three-quarter inches, seventh turn, to one and one-quarter inches adjacent the slot edge 43. The minimum height of the flight was about seven-tenths of the full height. In Example II the height of the flight was reduced from one and three-quarter inches, seventh turn, to one and one-half inches adjacent the slot edge 43. The minimum height of the flight was about eighty-five hundredths of the full height.

It is further believed that graduating the height of the flight downstream of slot edge 43 so that there is some diminution in the height of the flight extending at least about one full turn downstream from slot edge 43 permits backflow of bedding over the flight, thereby helping to reduce compaction.

I claim:

1. In apparatus for conveying cellulosic animal bedding which comprises a hopper having a bottom discharge opening in combination with a screw conveyor, the bottom of the hopper being connected at a downstream end connection and at an upstream end connection to a close fitting conveyor tube, said screw conveyor including a rotatable flight auger having a plurality of turns and extending from beneath the discharge opening of the hopper into the close fitting conveyer tube, wherein the auger flight extends a predetermined radial height, the improvement which comprises a reduction in the radial height of only those turns of the auger flight immediately upstream and immediately downstream of the downstream end connection.

2. The apparatus of claim 1 wherein the turns having the reduced radial height are at least about three quarters of the predetermined radial height.

3. The apparatus of claim 2 wherein the turns having the reduced radial height are between 60% and 90% of the predetermined radial height.

4. The apparatus of claim 2 wherein the reduction in radial height is greatest at the downstream end connection.

* * * * *